(12) United States Patent
Menonna et al.

(10) Patent No.: US 10,480,570 B2
(45) Date of Patent: Nov. 19, 2019

(54) METHOD FOR PRODUCING A BEARING ASSEMBLY

(71) Applicant: Mahle International GmbH, Stuttgart (DE)

(72) Inventors: Antonio Menonna, Ditzingen (DE); Roland Schacherer, Geisingen (DE); Christoph Steinmetz, Ludwigsburg (DE); Christoph Unrath, Urbach (DE)

(73) Assignee: Mahle International GmbH (DE)

( * ) Notice: Subject to any disclaimer, the term of this patent is extended or adjusted under 35 U.S.C. 154(b) by 282 days.

(21) Appl. No.: 15/451,364

(22) Filed: Mar. 6, 2017

(65) Prior Publication Data

US 2017/0254360 A1 Sep. 7, 2017

(30) Foreign Application Priority Data

Mar. 7, 2016 (DE) .......................... 10 2016 203 654

(51) Int. Cl.
*B23P 15/00* (2006.01)
*F01L 1/047* (2006.01)
(Continued)

(52) U.S. Cl.
CPC .......... *F16C 19/522* (2013.01); *B23P 15/003* (2013.01); *F01L 1/047* (2013.01);
(Continued)

(58) Field of Classification Search
CPC .......... F16H 57/0025; F16H 2057/005; F16H 2057/0056; F16C 41/04; F16C 2223/32; F16C 3/06; F16C 3/10; F16C 3/18; F16C 9/02; F16C 33/72; F16C 35/063; F16C 43/04; F16C 2226/14; Y10T 29/49901;
(Continued)

(56) References Cited

U.S. PATENT DOCUMENTS 2,810,243 A * 10/1957 Mellowes ............... B65B 25/24
206/0.82
3,958,847 A 5/1976 Cain et al.
(Continued)

FOREIGN PATENT DOCUMENTS

DE 3130994 A1 2/1983
DE 102009009664 A1 8/2010
(Continued)

OTHER PUBLICATIONS

European Search Report dated Aug. 10, 2017 related to corresponding European Patent Application No. 17156020.4.
English abstract for DE-102011004803.

*Primary Examiner* — Matthew P Travers
(74) *Attorney, Agent, or Firm* — Fishman Stewart PLLC

(57) ABSTRACT

A method for producing a bearing assembly for mounting a control shaft, for example a camshaft, may include: providing a bearing; arranging at least two rings on respective axial front sides of the bearing; pushing the bearing together with the at least two rings onto an assembly mandrel; pre-tensioning the at least two rings against the respective axial front sides of the bearing; at least one of (i) pushing a shrink hose over the bearing and the at least two rings and heating the shrink hose, and (ii) winding a film strip over the bearing and the at least two rings; and withdrawing the assembly mandrel.

9 Claims, 3 Drawing Sheets

(51) Int. Cl.
*F16C 35/063* (2006.01)
*F16C 19/52* (2006.01)
*F16C 41/04* (2006.01)
*F16C 19/46* (2006.01)
*F16H 57/00* (2012.01)

(52) U.S. Cl.
CPC .......... *F16C 19/466* (2013.01); *F16C 35/063* (2013.01); *F16C 41/04* (2013.01); *B23P 2700/02* (2013.01); *F01L 2001/0476* (2013.01); *F16C 2360/18* (2013.01); *F16H 2057/005* (2013.01); *F16H 2057/0056* (2013.01)

(58) Field of Classification Search
CPC .......... Y10T 29/49293; Y10T 29/49286; Y10T 29/49696; Y10T 29/497; Y10T 29/49703; Y10T 29/49904; Y10T 29/49925–29/49927; Y10T 29/49931; B23P 15/003; B23P 2700/02; B23P 2700/07; F01L 1/047; F01L 2001/0471; F01L 2001/0476; B65B 11/00; B65B 25/24; B65B 33/02; B65B 53/02
See application file for complete search history.

(56) References Cited

U.S. PATENT DOCUMENTS

| | | | |
|---|---|---|---|
| 4,450,609 A * | 5/1984 | Hamilton | B23P 19/042 206/318 |
| 4,556,400 A | 12/1985 | Krude et al. | |
| 6,688,770 B1 * | 2/2004 | Schottdorf | F16C 33/7859 384/446 |
| 2008/0139420 A1 * | 6/2008 | Takiuchi | B65D 65/42 508/100 |
| 2008/0289592 A1 | 11/2008 | Flender et al. | |
| 2012/0037103 A1 | 2/2012 | Schneider et al. | |

FOREIGN PATENT DOCUMENTS

| | | |
|---|---|---|
| DE | 102011004803 A1 | 8/2012 |
| EP | 1995417 A1 | 11/2008 |
| JP | 2008025738 A | 2/2008 |

* cited by examiner

METHOD FOR PRODUCING A BEARING ASSEMBLY

CROSS-REFERENCE TO RELATED APPLICATIONS

This application claims priority to German Patent Application No. DE 10 2016 203 654.8, filed on Mar. 7, 2016, the contents of which are hereby incorporated by reference in its entirety.

TECHNICAL FIELD

The present invention relates to a method for producing a bearing assembly for mounting a control shaft. The invention additionally relates to a bearing assembly produced by this method and a method for producing a control shaft using such a bearing assembly.

BACKGROUND

The production of cam shafts or control shafts in general is usually made by joining individual components, for example, bearings and cams, on the camshaft, whereupon the camshaft is then ground, in particular in the area of the cams, and thereby finish-treated. Specifically during this finish treatment by grinding, grinding dust is produced which can penetrate into the bearing or in particular into the bearing surfaces, settle there and during subsequent operation of an internal combustion engine fitted with the camshaft, can result in increased wear and in the most unfavourable case, even in damage to the bearings. For this reason, it is known to protect the bearings, for example roller or needle bearings, from contamination during grinding of the cams by manually applied cages. However, these cages must be laboriously screwed on manually and unscrewed again after the actual grinding process, which is not only time-consuming but also cost-intensive.

SUMMARY

The present invention is therefore concerned with the problem of providing a method for producing a control shaft which overcomes the disadvantages known from the prior art.

This problem is solved according to the invention by the subject matter of the independent claim(s). Advantageous embodiments are the subject matter of the dependent claims.

The present invention is based on the general idea of initially producing a pre-fabricated bearing assembly which is already protected by means of a shrunk-on shrink hose or wound-on film strip in such a manner that this can be used in the prefabricated state during the manufacture of control shafts without an additional (dirt) cage since the shrink hose or the film strip protects the bearing device from any grinding dust/grinding sludge/grinding particles which may occur. In the method according to the invention for producing a bearing assembly, firstly a bearing is prepared or produced by mounting, for example, roller bodies in a bearing ring. Then the bearing together with two rings arranged on the front side, in particular plastic or metal rings, is pushed onto an assembly mandrel. The two rings are thereby pre-tensioned against the front sides, that is the axial front sides, of the bearing. Now the shrink hose is pushed over the bearing and the two rings and shrunk onto these by heating. Alternatively to this, the film strip can also be wound over the bearing and the two rings. Then, the bearing assembly thus pre-fabricated and held together by the shrunk-on shrink hose or the wound-on film strip can be withdrawn from the assembly mandrel and supplied to further manufacture of the control shaft. The pre-fabricated bearing assembly can be reserved for the production of the control shaft, whereby a hitherto extremely complex production process can be at least slightly simplified.

The present invention is further based on the general idea of now arranging the bearing assembly produced according to the previously described method on a corresponding control-shaft shaft/camshaft shaft together with at least one control element/cam, wherein the control elements/cams can, for example, be thermally joined whilst at least one pre-fabricated bearing assembly is merely pushed onto the control-shaft shaft and fixed by means of the two rings. In a following process step, the cams or control elements can now be ground, without the grinding dust or grinding sludge produced in this case penetrating into the bearings, that is into the bearing assembly (assemblies) and resulting in undesirable contamination there. Once the grinding process is completed, the shrink hose or the film strip over the at least one bearing assembly is removed by, for example, pulling a tear tab which tears the shrink hose along a material weakening, for example, a perforation seam and thereby makes it easily removable. A film strip can be simply unwound. In the method according to the invention for producing the control shaft, in particular the hitherto necessary, laborious and therefore costly mounting of the protective cage over the individual bearings can be dispensed with, with the result that the manufacturing process is not only considerably simplified but can also be significantly more cost-effective. When installing the camshaft according to the invention in a cylinder head cover or a cylinder head of an internal combustion engine, before reaching the final installation end position, this is displaced to and fro by a few tenths of a millimeter, for example, about 0.6 mm in the axial direction in order to achieve an at least slight spacing between the bearing and the two rings arranged on the front side thereto and thereby enable a clearance. Naturally not only cams per se but also eccentric disks, sensors, signal generators or other components with at least one bearing assembly can be slid onto the control shaft/camshaft according to the invention.

The present invention is further based on the general idea of pre-fabricating a bearing assembly produced according to the method described initially in a separate fabrication step and thus being able to make the mounting of a control shaft fitted therewith simpler and in particular more flexible. As already mentioned initially, the shrink hose can in this case comprise a tear tab by means of which by applying a corresponding pulling force, it is possible to tear off the shrink hose and thereby easily remove the same. In order to simplify the tearing off and also the removal of the shrink hose, this can have a material weakening, for example a perforation, with the result that a comparatively simple and cost-effective desired tearing point is created. The material weakening can naturally also be produced by scoring, cutting or by means of a laser, with the result that not only a high-quality but in addition, also a cost-effective manufacture of such a material weakening is possible. In a further advantageous embodiment of the solution according to the invention, the ring have a smaller outside diameter that the bearing, whereby it can be ensured that the rings are used exclusively for axial securing of the bearing on the control-shaft shaft but do not come in contact, for example with a bearing seat of a cylinder head or a cylinder head cover.

In a further advantageous embodiment of the bearing assembly according to the invention, it is provided that the shrink hose has a larger axial length than the bearing assembly and as a result, at the longitudinal end side in the shrunk-on state, embraces the two rings on the front side and thereby holds together the entire bearing assembly. As a result, a not only compact by also extremely stable bearing assembly can be created without individual components thereof such as, for example, the two rings and the bearing needing to be additionally fixed on one another.

In a further advantageous embodiment of the solution according to the invention, the rings have front-side oil conveying structures, in particular grooves, slots, webs or hemispherical elevations. After mounting of the bearing assembly on the control-shaft shaft, the control-shaft shaft is displaced to and/or fro slightly in the axial direction, with the result that an at least small axial gap is formed between the bearing and the two rings arranged on the front side which allows clearance. At least on the front side facing the bearing, the rings have the previously described oil conveying structures which during operation of the internal combustion engine allow a continuous oil supply, for example, generally a continuous lubricant supply into the bearing and thereby ensure a reliable lubrication of the roller bearings and in addition enable a smooth-running mounting of the camshaft in the long term.

Further important features and advantages of the invention are obtained from the subclaims, from the drawings and from the relevant description of the figures with reference to the drawings.

It is understood that the features mentioned previously and to be explained hereinafter can be used not only in the respectively given combination but also in other combinations or alone without departing from the framework of the present invention.

Preferred exemplary embodiments of the invention are shown in the drawings and are explained in detail in the following description where the same reference numbers refer to the same or similar or functionally the same components.

BRIEF DESCRIPTION OF THE DRAWINGS

In the figures, schematically in each case

DETAILED DESCRIPTION

Figure 4:
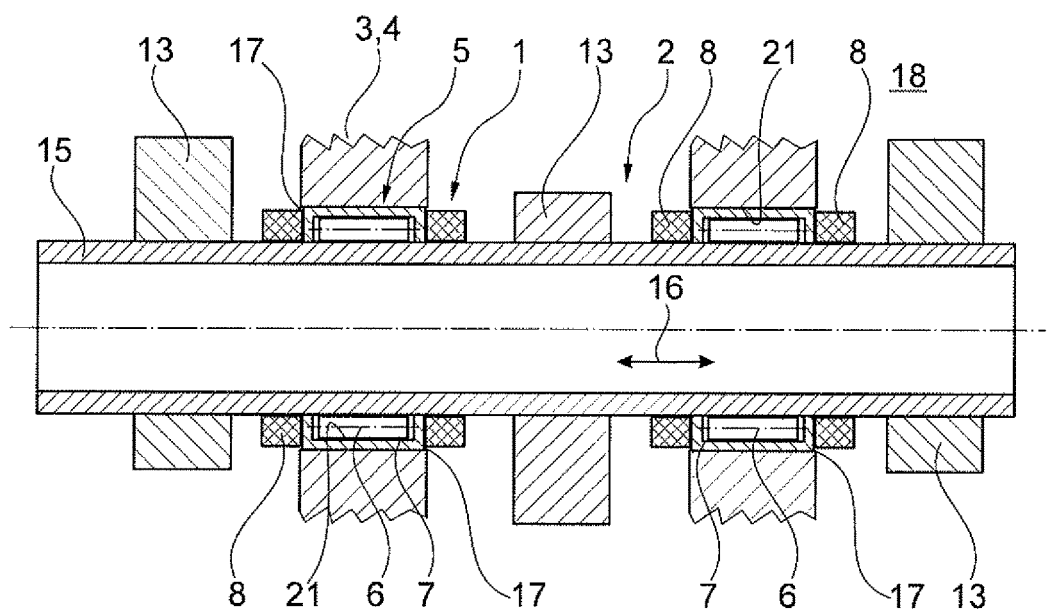
FIG. 4 shows a sectional view through a cylinder head or a cylinder head over with installed camshaft with shrink hoses removed from the bearing assemblies at the same time.

According to FIG. 1, in a method according to the invention for producing a bearing assembly 1 by means of which subsequently, for example a control shaft/camshaft 2 is mounted in a cylinder head 3 or a cylinder head cover 4 (cf. FIG. 4), a bearing 5 is firstly prepared or produced by mounting or arranging roller bodies 6 in a bearing ring 7.

The term "control shaft" can hereinafter frequently be equated to the term "camshaft". The roller bodies 6 can in this case, for example, be configured as rolls or as needles but also as spheres. This bearing 5 together with two rings 8 arranged on the front side thereto, in particular with plastic or metal rings, is then pushed onto an assembly mandrel 9 (cf. FIG. 1), where the two rings 9 are pre-tensioned towards the front sides of the bearing 5 by means of a corresponding sleeve 10. This is brought about by the sleeve 10 pressing onto the upper ring 8 and the lower ring 8 resting on a bracket or a stop 11 of the assembly mandrel 9. A shrink hose 12 is then pushed over the bearing 5 and the two rings 8 and shrunk onto these by heating. Alternatively to this, a film strip 12' can also be wound over the bearing 5 and the two rings 8. The film strip 12 is thereby wound under tension and partially overlapping over the bearing 5 and the two rings 8 in order to ensure tightness.

Figure 1:
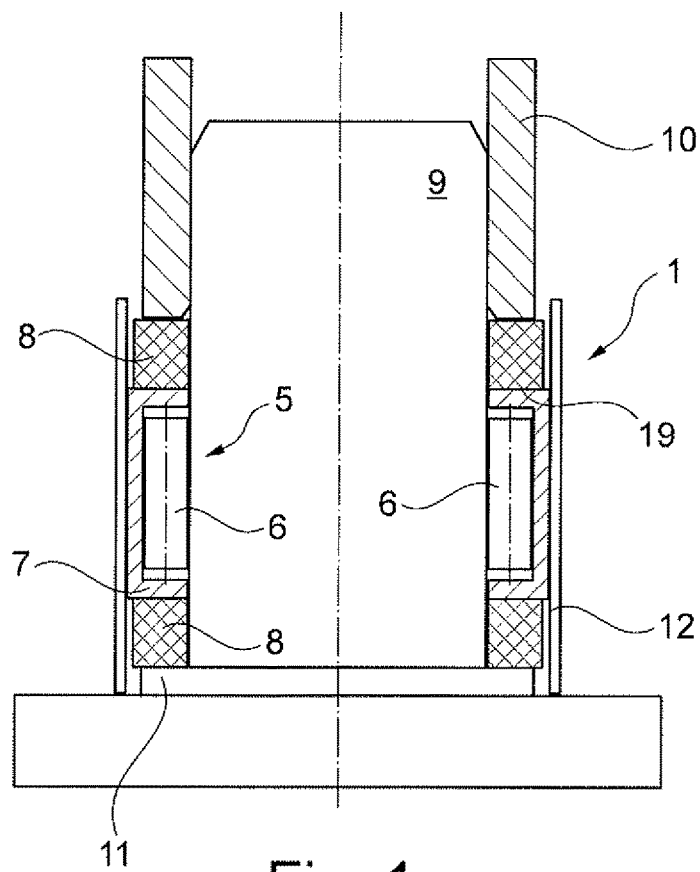
FIG. 1 shows a sectional view through a bearing assembly according to the invention during assembly on an assembly mandrel.
Figure 2:
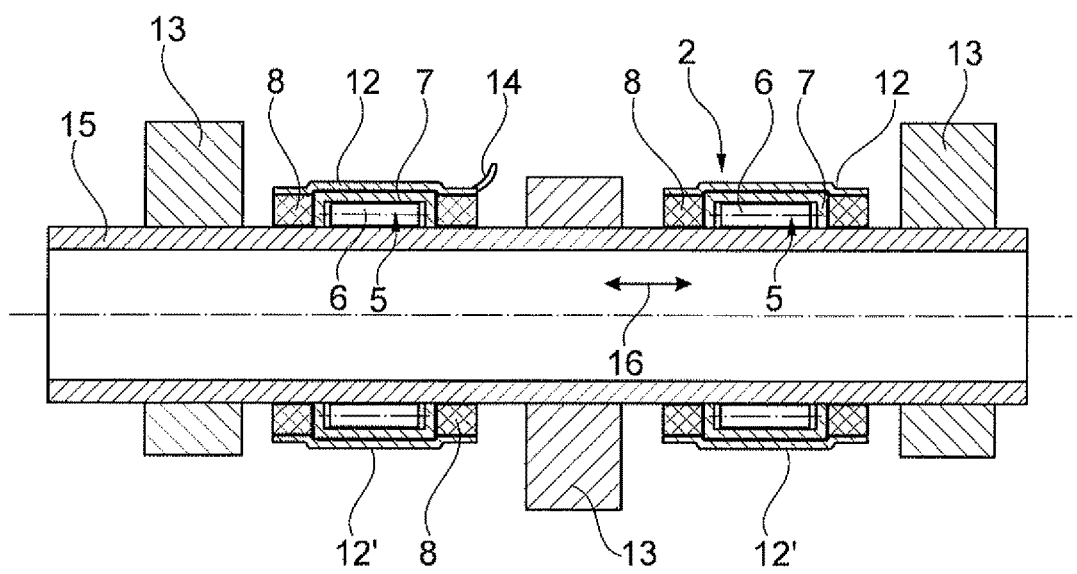
FIG. 2 shows a sectional view through a camshaft produced according to the invention before grinding the cams with shrink hose still applied to the bearing assemblies.
Figure 3:
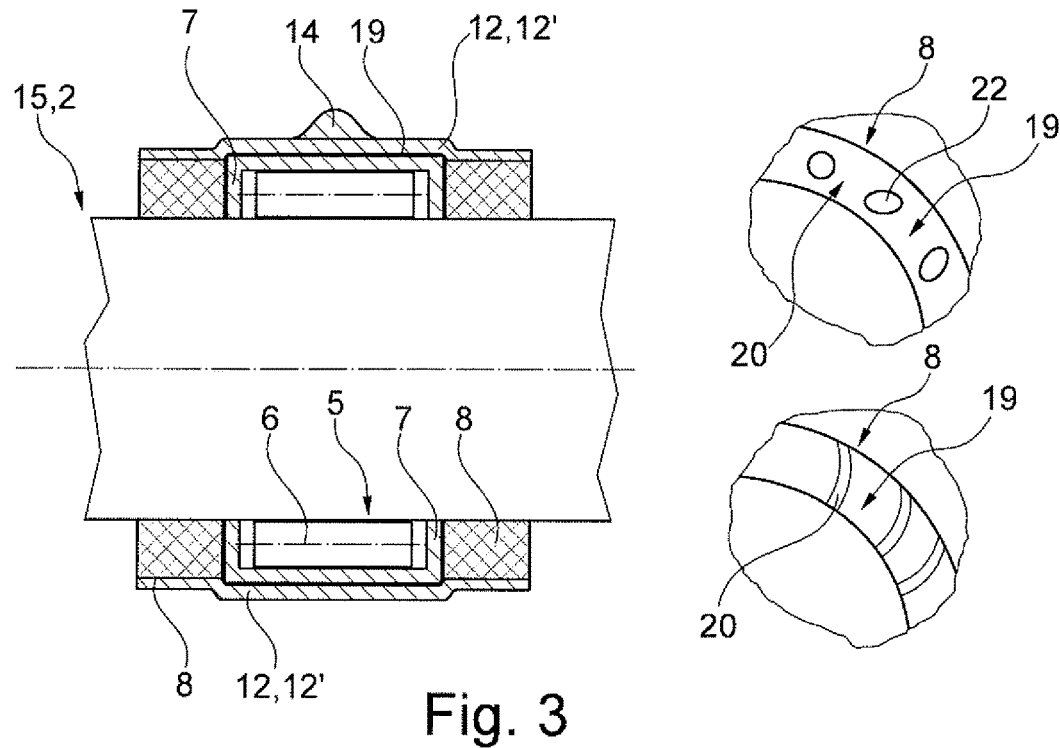
FIG. 3 shows a detailed view from FIG. 2.

FIG. 1 shows the state of the shrink hose 12 before heating, whereas FIGS. 2 and 3 show the state after shrinking the shrink hose 12 onto the rings 8 and the bearing 5 or the film strip 12' wound under tension over the bearing 5 and the two rings 8. This is wound in a partially overlapping manner so that gaps can be avoided and a tight packing for the bearing 5 and the ring 8 can be ensured. The bearing assembly 1 now thus pre-fabricated can now be removed from the assembly mandrel 9. As can be deduced from FIG. 1, the bracket 11 or the stop 11 has the effect that the shrink hose 12 can be pushed further downwards on the front side so that for example, it is also possible for the rings 8 to be embraced by the shrink hose 12 on the front side. The rings 8 can in this case have a structuring radially on the outer side at least in the overlap region of the shrink hose 12. According to FIGS. 2 and 3, the shrink hose 12 thereby however does not embrace the front sides of the two rings but merely holds these firmly on its outer lateral surface.

The bearing assembly 1 according to the invention thus consists of the actual bearing 5, the bearing ring 7 and the roller bodies 6 mounted therein, the two rings 8 arranged on the front side thereto and the shrink hose 12 shrunk thereon, which fixes the two rings 8 on the bearing 5.

The shrunk-on shrink hose 12 or the wound-on film strip 12' protects the bearing 5 during grinding of cams 13 from penetrating grinding particles and therefore from any accompanying damage. A tear tab 14, for example, can be provided on the shrink hose 12, which makes it easier to tear off and therefore remove the shrink hose 12 from the bearing assembly 1 after grinding. A film strip 12' can be simply unwound. The shrink hose 12 can furthermore have a material weakening, for example, in the manner of a perforation which additionally simplifies the removal of the shrink hose 12 after grinding of the cams 13. The shrink hose 12 or the film strip 12' can also have a layer which increases the sealing effect at least partially from inside, in particular an adhesive layer.

The bearing assembly 1 generally fabricated separately according to the invention is now slid onto a control-shaft shaft 15 during assembly of the control shaft/camshaft 2 with at least one control element, in particular a cam 13, where it is naturally clear that not only one bearing assembly 1 and one control element/cam 13 are slid onto the control-shaft shaft 15 but in each case a plurality thereof. When the bearing assemblies 1 are pushed onto the control-shaft shaft 15 and the control elements, in particular the cams 13 are joined to the control-shaft shaft 15, for example, by a thermal shrink fit, an after-treatment or finishing of the control element/cams 13 can be accomplished, in particular by grinding. The bearing assemblies 8 are held on the control-shaft shaft 15. When the finishing, for example, by grinding the cams 13 is completed, the camshaft 2 can be cleaned and the shrink hose 12 or the film strip 12' can be opened and removed from the individual bearing assemblies 1, for example, by tearing on the tear tab 14 and the pre-fabricated camshaft 2 can be inserted into the cylinder head 3 or the cylinder head cover 4.

Before reaching the end position of the camshaft 2 in the cylinder head 3 or in the cylinder head cover 4, the control-shaft shaft 15 is moved to and fro slightly in the axial direction relative to the bearing 5 and a minimal distance 17 in the axial direction 16 between the two rings 8 and the bearing 5 is thereby created, enabling a clearance of the bearing 5.

Figure 5:
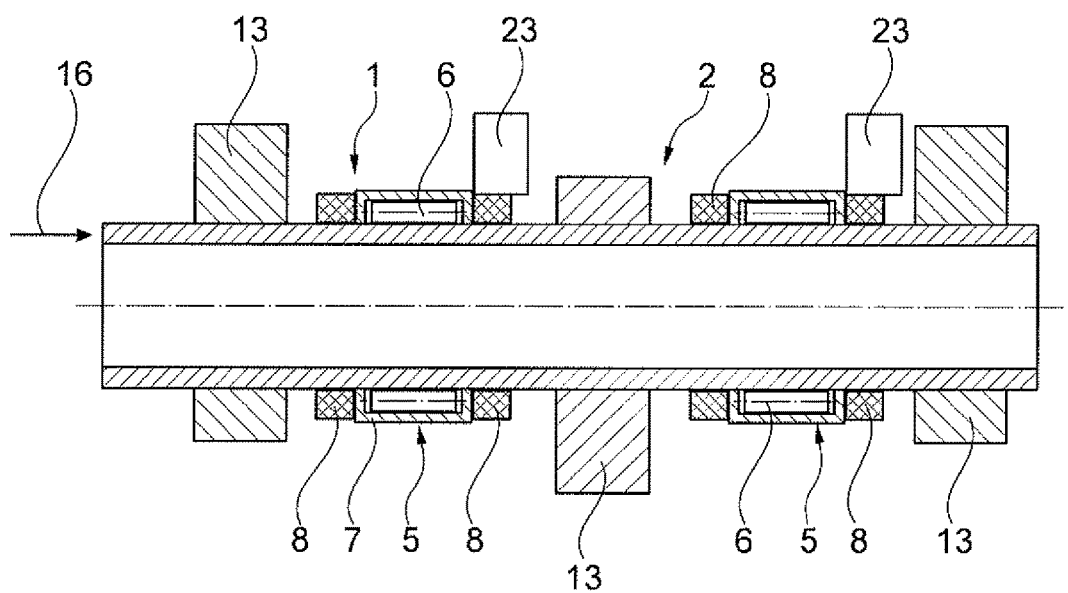
FIG. 5 shows a sectional view through the control shaft during axial displacement of the control-shaft shaft to create a clearance.

Usually after removal of the shrink hose 12 or the film strip 12', the bearings 5 of the control shaft 2 can be fixed axially to create the clearance before insertion in the cylinder head 3 and the control shaft 2 is displaced in the axial direction preferably by at least ⅒ mm as shown in FIG. 5. For this purpose an axial force is exerted on the control shaft 2 and at the same time the bearings 5 are held by means of retaining contours 23.

In order to be able to reliably ensure sufficient lubrication of the bearing 5 during operation of the control shaft 2 installed in an internal combustion engine 8, oil-conveying structures or oil conveying structures 20 (see detailed view from FIG. 3), in particular grooves, slots, webs or hemispherical elevations 22 can be provided on one of the front sides 19 of the two rings 8 facing the bearing ring 7, which enable a reliable transport of oil into the area between the roller bodies 6 and the control-shaft shaft 15 and thereby on the one hand enable reliable lubrication of the bearing 5 and on the other hand a smooth-running mounting of the control shaft 2.

If FIGS. 1 to 4 are viewed again, it can be see that the rings 8 have a smaller outside diameter than the bearing ring 7 with the result that a simplified insertion of the control shaft 2 into the relevant bearing opening 21 of the cylinder head 3 or cylinder head cover 4 is made possible.

Using the method according to the invention for producing the bearing assembly 1 according to the invention and the resulting method according to the invention for producing the control shaft 2, the latter can be produced significantly more simply and cost-effectively since in particular a laborious covering of the bearings 5 during grinding of the control elements, in particular the cams 13 is omitted. On the contrary the bearings 5 are protected from any unwanted ingress of grinding dust by means of the two rings 8 arranged on the front side thereto and the shrink hose 12 shrunk thereover or the film strip 12' wound thereover. This can be removed significantly more simply compared to the protective cages known hitherto from the prior art, for example by simply tearing off or away or unwinding.

The invention claimed is:

1. A method for producing a bearing assembly for mounting a control shaft, comprising:
   providing a bearing;
   arranging at least two rings on respective axial front sides of the bearing;
   pushing the bearing together with the at least two rings onto an assembly mandrel;
   pre-tensioning the at least two rings against the respective axial front sides of the bearing;
   at least one of (i) pushing a shrink hose over the bearing and the at least two rings and heating the shrink hose, and (ii) winding a film strip over the bearing and the at least two rings; and
   withdrawing the assembly mandrel.

2. The method according to claim 1, wherein the film strip is wound over the bearing and the at least two rings, and wherein winding the film strip includes winding the film strip under tension and partially overlapping over the bearing and the at least two rings.

3. The method according to claim 1, wherein the shrink hose is pushed over the bearing and the at least two rings, and wherein heating the shrink hose includes shrinking the shrink hose onto the bearing and the at least two rings.

4. A method for producing a control shaft, comprising:
   providing at least one pre-fabricated bearing assembly, wherein providing the at least one pre-fabricated bearing assembly includes:
   providing a bearing;
   arranging at least two rings on a respective axial front side of the bearing;
   pushing the bearing together with the at least two rings onto an assembly mandrel;
   pre-tensioning the at least two rings against the respective axial front side of the bearing;
   covering the bearing and the at least two rings with a protective material to produce the at least one pre-fabricated bearing assembly, wherein covering the bearing and the at least two rings with the protective material includes at least one of:
   pushing a shrink hose over the bearing and the at least two rings and heating the shrink hose; and
   winding a film strip over the bearing and the at least two rings; and
   withdrawing the at least one pre-fabricated bearing assembly from the assembly mandrel;
   arranging the at least one pre-fabricated bearing assembly and at least one control element on a control-shaft shaft; and
   removing the protective material from the at least one bearing assembly.

5. The method according to claim 4, further comprising grinding the at least one control element and cleaning the control shaft after arranging the at least one pre-fabricated bearing assembly and the at least one control element on the control-shaft shaft.

6. The method according to claim 4, wherein removing the protective material includes removing at least one of the shrink hose and the film strip by at least one of scoring, cutting, and lasering.

7. The method according to claim 4, further comprising fixing the bearing axially and displacing the control shaft in an axial direction after removing the protective material from the at least one bearing assembly.

8. The method according to claim 4, wherein removing the bearing material from the at least one bearing assembly includes separating the shrink hose along a material weakening perforation.

9. The method according to claim 4, wherein the protective material is the film strip, and wherein winding the film strip includes winding the film strip under tension and partially overlapping over the bearing and the at least two rings.

\* \* \* \* \*